United States Patent
Won

(10) Patent No.: US 8,750,907 B2
(45) Date of Patent: Jun. 10, 2014

(54) APPARATUS AND METHOD FOR PROVIDING POSITION INFORMATION IN A MOBILE COMMUNICATION SYSTEM

(75) Inventor: Young-Min Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 279 days.

(21) Appl. No.: 12/927,910

(22) Filed: Nov. 29, 2010

(65) Prior Publication Data

US 2011/0077023 A1 Mar. 31, 2011

Related U.S. Application Data

(63) Continuation-in-part of application No. 12/589,354, filed on Oct. 22, 2009, now abandoned.

(30) Foreign Application Priority Data

Oct. 23, 2008 (KR) .................. 10-2008-0103976
Jun. 5, 2009 (KR) .................. 10-2009-0049713

(51) Int. Cl.
*H04W 24/00* (2009.01)
*H04M 1/00* (2006.01)

(52) U.S. Cl.
USPC ............ 455/457; 455/456.1; 455/456.2; 455/456.6; 455/566

(58) Field of Classification Search
USPC ............ 455/410–411, 412.2, 418–420, 455/456.1–456.3, 456.6, 457, 459, 466, 455/550.1, 556.2, 566; 348/14.01–14.04, 348/14.07–14.09, 14.16; 342/357.22, 342/357.25, 357.39–357.4, 357.43–357.44
See application file for complete search history.

(56) References Cited

U.S. PATENT DOCUMENTS

| | | | | |
|---|---|---|---|---|
| 5,689,809 A | * | 11/1997 | Grube et al. | 455/457 |
| 6,718,176 B2 | * | 4/2004 | Michaud et al. | 455/457 |
| 6,850,188 B1 | * | 2/2005 | Lee et al. | 342/357.52 |
| 7,317,927 B2 | * | 1/2008 | Staton et al. | 455/456.4 |
| 7,873,363 B1 | * | 1/2011 | Hieb | 455/446 |
| 8,233,896 B2 | * | 7/2012 | Wehling | 455/421 |
| 8,302,033 B2 | * | 10/2012 | Matas et al. | 715/863 |
| 2001/0048364 A1 | * | 12/2001 | Kalthoff et al. | 340/573.1 |
| 2004/0266398 A1 | * | 12/2004 | Adamczyk et al. | 455/412.1 |
| 2006/0255935 A1 | * | 11/2006 | Scalisi et al. | 340/539.13 |
| 2006/0270421 A1 | * | 11/2006 | Phillips et al. | 455/457 |
| 2007/0142091 A1 | * | 6/2007 | Gasborro et al. | 455/566 |
| 2009/0197617 A1 | * | 8/2009 | Jayanthi | 455/456.2 |

* cited by examiner

*Primary Examiner* — Meless Zewdu

(57) ABSTRACT

A method and an apparatus for providing position information in a mobile communication system includes setting, at a mobile communication terminal which requests to provide the position information, a position condition to provide the position information. The mobile communication terminal generates a message including the position condition, and sends the generated message to a correspondent terminal of which the position information is to be acquired. The mobile communications terminal also receives a position information request message including the position condition from a correspondent terminal, determines whether the position condition is violated or not by periodically acquiring its position information, and sends a message informing of the position information violation to the correspondent terminal when the position condition is violated.

20 Claims, 15 Drawing Sheets

| POSITION SERVICE SETTING | |
|---|---|
| TYPE | ◀ POSITION WARNING ▶ |
| RECIPIENT NUMBER | 01095300168 |
| APPOINTED HOUR | |
| START | 17:50 |
| END | 18:50 |
| DESIGNATED RADIUS | ◀ 50M ▶ |
| SMS AUTO TRANSMISSION | ◀ YES ▶ |
| MEMO | GO HOME WITHIN 2 HOURS |
| SET | CANCEL |

FIG.6A

| POSITION SERVICE SETTING | |
|---|---|
| TYPE | ◀ POSITION MONITORING ▶ |
| RECIPIENT NUMBER | 01095300168 |
| APPOINTED HOUR | |
| START | 17:50 |
| END | 18:50 |
| DESIGNATED RADIUS | ◀ 100M ▶ |
| SMS AUTO TRANSMISSION | ◀ YES ▶ |
| MEMO | STUDY IN THE LIBRARY OVER 2 HOURS |
| SET | CANCEL |

FIG.6B

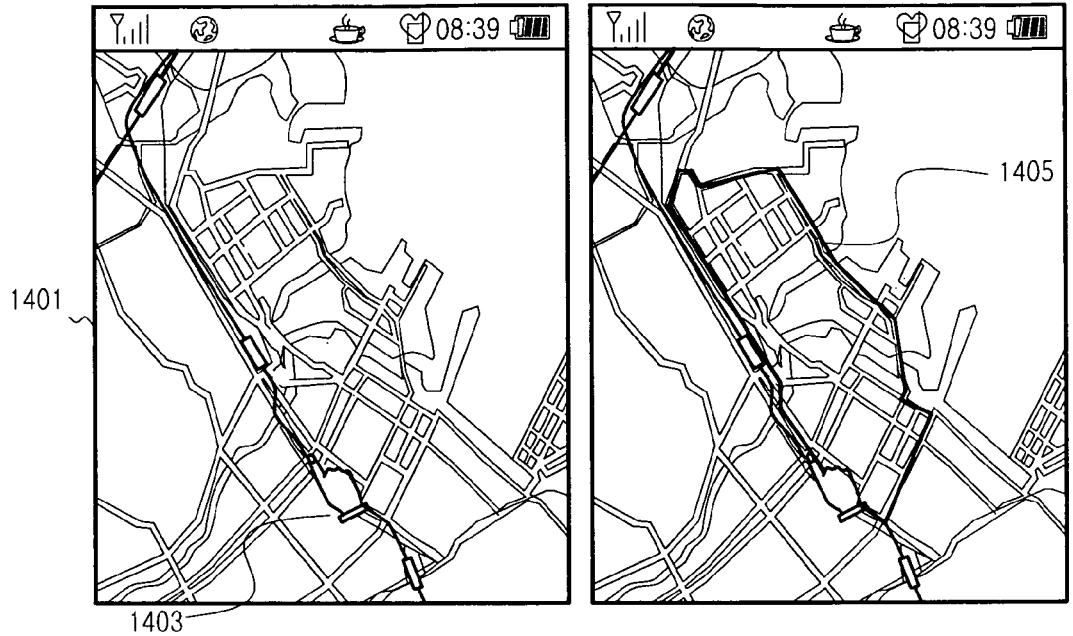
FIG.14A  FIG.14B
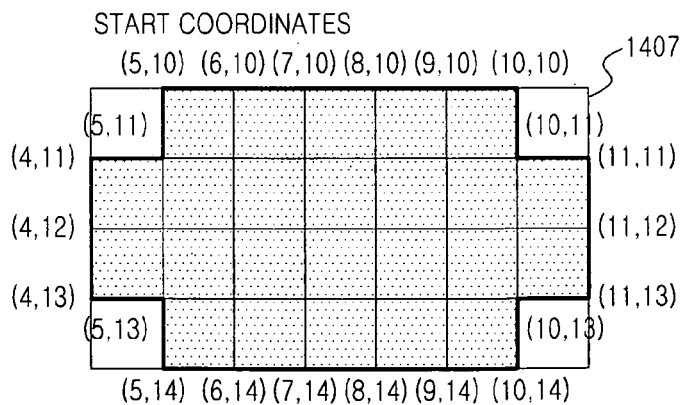
FIG.14C
FIG.14D

APPARATUS AND METHOD FOR PROVIDING POSITION INFORMATION IN A MOBILE COMMUNICATION SYSTEM

CROSS-REFERENCE TO RELATED APPLICATION(S) AND CLAIM OF PRIORITY

The present application is a continuation-in-part application of U.S. patent application Ser. No. 12/589,354 filed on Oct. 22, 2009 now abandoned which claims the benefit under 35 U.S.C. §119 to an application filed in the Korean Intellectual Property Office on Oct. 23, 2008, and assigned Serial No. 10-2008-0103976, and an application in the Korean Intellectual Property Office on Jun. 5, 2009, and assigned Serial No. 10-2009-0049713, the entire disclosures of which are hereby incorporated by reference.

TECHNICAL FIELD OF THE INVENTION

The present invention relates generally to an apparatus and a method for providing position information in a mobile communication system. More particularly, the present invention relates to an apparatus and a method for informing a correspondent mobile communication terminal of position information of a particular mobile communication terminal by transmitting and receiving messages between the mobile communication terminals.

BACKGROUND OF THE INVENTION

The use of mobile communication terminals is rapidly increasing due to their handy portability. To draw more users, service providers (terminal manufacturers) competitively develop terminals with far more convenient functions. For example, as crimes, such as kidnapping and abduction, are frequent these days, the mobile communication terminal provides an emergency paging service or a positioning service to the user against emergencies.

In regards to the positioning service, a mobile communication provider network receives a positioning request from a user terminal, tracks the position of the other user terminal, and informs the user of the obtained location. That is, when the user wants to know the location of another user, the user accesses the mobile communication provider network which provides the positioning service, inputs information of the terminal of the other user, is authenticated to track the position of the other user, and thus receives the current position of the other user from the mobile communication provider network. Representative examples of the positioning service include a friend searching service or a missing child searching service.

As discussed above, the conventional positioning service detects the location of the target terminal over the mobile communication network and informs the terminal requesting the positioning of the detected location. In other words, the conventional positioning service incurs the additional cost for the mobile communication network access, and the user needs to continuously access the positioning service in some cases to detect the location of the target terminal. For example, to know the location of the child when the child goes to school or comes back from school, the parent has to access the corresponding service constantly, in real time, and receive the position information of his/her child.

In addition, because the positioning service provides only the information within a certain radius of a particular location, a region unwanted by the user can be set as a search area.

SUMMARY OF THE INVENTION

To address the above-discussed deficiencies of the prior art, it is a primary aspect of the present invention is to address at least the above mentioned problems and/or disadvantages and to provide at least the advantages described below. Accordingly, an aspect of the present invention is to provide a method and an apparatus for providing position information in a mobile communication system.

Another aspect of the present invention is to provide a method and an apparatus for providing position information independent of a mobile communication provider by transmitting and receiving messages between mobile communication terminals.

Another aspect of the present invention is to provide an apparatus and a method for a particular mobile communication terminal to set a position condition of the other mobile communication terminal, to send a message including the position condition to the other mobile communication terminal, and to recognize violation of the position condition of the other mobile communication terminal when it violates the position condition.

Another aspect of the present invention is to provide an apparatus and a method for a mobile communication terminal to periodically receive position information of a target mobile communication terminal.

Another aspect of the present invention is to provide an apparatus and a method for a mobile communication terminal to display position and distance information of a target mobile communication terminal such that a user can intuitively perceive the information.

Another aspect of the present invention is to provide a method and an apparatus for a mobile communication terminal to set a region for providing position information.

Another aspect of the present invention is to provide a method and an apparatus for a mobile communication terminal to generate and transmit information related to a region for providing position information to another mobile communication terminal.

Another aspect of the present invention is to provide a method and an apparatus for a mobile communication terminal to determine a position region corresponding to a user touch as a position condition of another mobile communication terminal.

According to one aspect of the present invention, a method for a mobile communication terminal requesting to provide position information includes generating a message comprising a position condition for a correspondent terminal; sending the generated message to the correspondent terminal; and receiving a message indicating whether the position condition is violated, from the correspondent terminal.

According to another aspect of the present invention, a method of a mobile communication terminal requested to provide position information includes receiving a message comprising a position condition from a correspondent terminal; determining whether the position condition is violated by periodically acquiring position information of the terminal; and sending a message indicating whether the position condition is violated to the correspondent terminal.

According to another aspect of the present invention, an apparatus of a mobile communication terminal requesting to provide position information includes a controller for generating a message comprising a position condition for a correspondent terminal; and a transceiver for sending the generated message to the correspondent terminal under the control of the controller and receiving a message indicating whether the position condition is violated, from the correspondent terminal.

According to yet another aspect of the present invention, an apparatus of a mobile communication terminal requested to provide position information includes a transceiver for receiving a message comprising a position condition from a correspondent terminal; a Global Positioning System (GPS) receiver for acquiring position information of the terminal; and a controller for determining whether the position condition is violated by periodically acquiring the position information of the terminal through the GPS receiver, and controlling the transceiver to send a message indicating whether the position condition is violated to the correspondent terminal.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6A and 6B illustrate screen views for setting a position condition of the target terminal at the tracer terminal according to an embodiment of the present invention;

FIGS. 14A through 14D illustrate the generation of the position region information by setting the position region according to the user touch in the tracer terminal according to an embodiment of the present invention.

Throughout the drawings, like reference numerals will be understood to refer to like parts, components and structures.

DETAILED DESCRIPTION OF THE INVENTION

FIGS. 1 through 14D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Embodiments of the present invention provide a method and an apparatus for a particular mobile communication terminal to send a message including a position condition to a target mobile communication terminal and for the target mobile communication terminal to inform the particular mobile communication terminal of its violation of the position condition. Also, embodiments of the present invention provide a method and an apparatus for a tracer terminal to directly set a region that indicates a position condition of a target terminal according to a user touch and to generate region information that indicates the defined region information.

Figure 1:
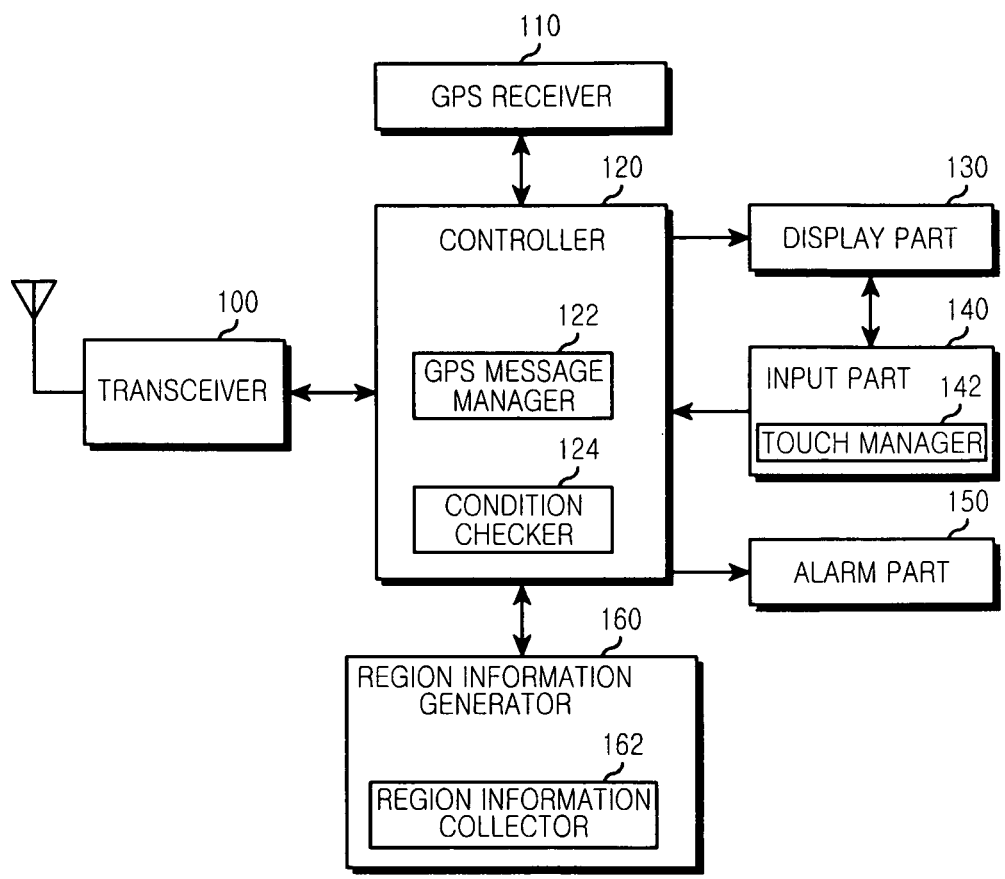
FIG. 1 illustrates a mobile communication terminal according to an embodiment of the present invention.

FIG. 1 illustrates a block diagram of a mobile communication terminal according to an embodiment of the present invention. Hereinafter, the mobile communication terminal can be a cellular phone, personal communication system, personal digital assistant, and International Mobile Telecommunication (IMT) 2000 terminal. The following explanations adopt a general structure of those terminals.

The terminal of FIG. 1 includes a transceiver 100, a Global Positioning System (GPS) receiver 110, a controller 120, a display part 130, an input part 140, an alarm part 150, and a region information generator 160. The controller 120 includes a GPS message manager 122 and a condition checker 124. The input part 140 includes a touch manager 142. The region information generator 160 includes a region information collector 162.

The transceiver 100 can send and receive radio signals of input and output data via an antenna. According to an embodiment of the present invention, the transceiver 100 sends and receives messages for a position information service to and from the other terminal under the control of the controller 120.

The GPS receiver 110 can receive a radio wave from a GPS satellite and acquire position information of the mobile communication terminal. Under the control of the controller 120, the GPS receiver 110 can acquire the position information by periods and can provide the acquired position information to the controller 120.

The controller 120 can control operations of the mobile communication terminal. More specifically, when an event for monitoring or warning of a position of a particular terminal is generated, the controller 120 can set a position condition (for example, start time, end time, movement radius, and position region) for the particular terminal, the controller 120 can generate a message including the position condition, and transmit the message to the particular terminal. When receiving a message including the position condition from the other terminal, the controller 120 can examine whether the position condition of the message is violated, and can inform the other terminal of the condition violation. In so doing, the controller 120 can detect a user's touch for map data displayed in a screen and define a particular region of the map data set by the user's touch as a position condition; that is, as a position region for the particular terminal.

In an embodiment, upon sensing the user touch for the map data displayed in the screen, the controller 120 confirms and stores coordinates of the location of the detected user's touch, and determines whether the setting of the position region is completed by examining whether the same location is touched again. For example, when the user's touch overlaps a touch start point to thus form a closed curve or a closed polygon, the controller 120 can determine the completion of the position region designation. In so doing, the controller 120 controls to store information indicative of the designated region (e.g., coordinates of the touch start point, actual latitude and longitude corresponding to the touch start point, a scale of the map, and coordinates of user's touch points). Also, the controller 120 controls the region information generator 160 to generate position region information including the information of the designated region, and controls and processes to transmit the generated region information added to the position condition to the other terminal.

When receiving such position region information from the other terminal, the controller 120 can determine a region designated by a user of the other terminal in the actual map data based on the received position region information, determine the corresponding region as the position condition of the terminal, and display the position condition in the display part 130.

Figure 13:
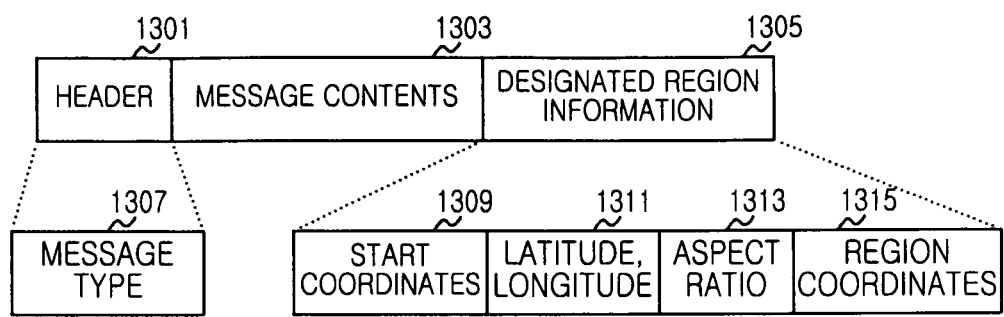
FIG. 13 illustrates position region information according to an embodiment of the present invention.

Under the control of the controller 120, the region information generator 160 collects and stores the information of the region designated by the user's map data touch, and generates the position region information using the stored information. The position region information can be generated as a message to send to the other terminal. The position region information can include a header field 1301, a message content field 1303, and a designated region information field 1305 as shown in FIG. 13. The header field 1301 includes message type information that indicates the corresponding message carrying the position region information, and the message content field 1303 includes contents to be added by the terminal user. The designated region information field 1305 includes coordinates of the user touch start point in the map data, actual latitude and longitude corresponding to the touch start point, a scale of the map, and coordinates of a user's touch points such that even the terminal receiving the message can acquire the region designated by the user's touch. That is, the terminal receiving the position region information can acquire the corresponding region by comparing the information of the designated region with the actual map data. The position region information shall be described in FIG. 13.

The region information collector 162 of the region information generator 160 checks and stores the coordinates of the location of the user's touch under the control of the region information generator 160. When the user's touch overlaps the touch start point to form a closed curve or a closed polygon, the region information collector 162 can determine the completion of the position region designation. The region information collector 162 stores information of the region designated by the user touch (e.g., coordinates of the touch start point, actual latitude and longitude corresponding to the touch start point, scale of the map, and coordinates of user's touch points). At this time, using data provided from the touch manager 142, the region information collector 162 can confirm the region designated by the user's touch.

The controller 120 can set a type of the message including the position condition of the particular terminal to the GPS service through the GPS message manager 122. To do so, the present invention defines and utilizes the message type for the position information service in addition to the existing message type. For example, a Short Message Service (SMS) message including a general text 502 is set to the SMS 500 in FIG. 5, the message type including the position condition 512 is set to the GPS Service (SVC) 510. Herein, the message of the GPS SVC type includes information relating to a service type, an appointed hour, a designated radius, an SMS automatic transmission setting, and a memo as the position conditions as shown in FIG. 6. The service type can include a position monitoring service to prevent the target terminal from moving out of the designated radius or the designated position region during the appointed hour, and a position warning service for making the target terminal move out of the designated radius or the designated position region within the appointed hour. The appointed hour indicates a start time and an end time of the position monitoring or warning. The designated radius or the designated position region indicates the range of the target terminal to keep or to egress according to the service type. The SMS automatic transmission setting indicates whether or not to automatically inform the tracer terminal which monitors or warns of the violation when the target terminal violates the condition of the designated radius or the designated position region during the appointed hour.

Figure 7A:
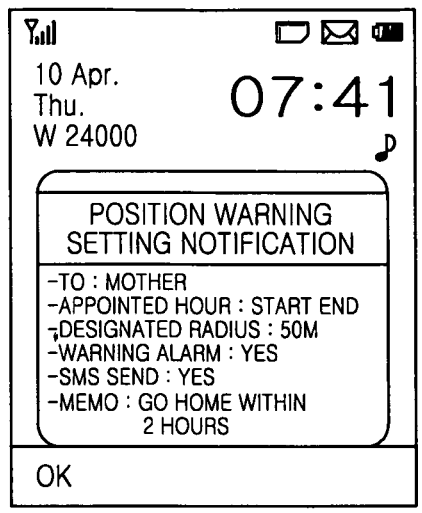
FIGS. 7A and 7B illustrate screen views of the position condition at the target terminal according to an embodiment of the present invention.
Figure 7B:
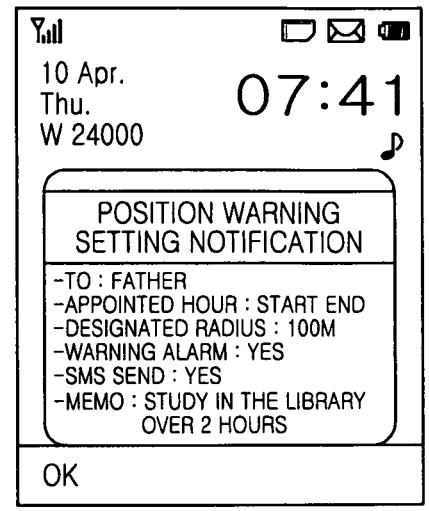

The controller 120 can check the type of the message received from the other terminal at the GPS message manager 122, and can acquire the position condition by analyzing the corresponding message when the message type is the GPS SVC type. For example, the GPS message manager 122 can obtain the position condition as shown in FIG. 7 by analyzing the message.

At the condition checker 124, the controller 120 can determine whether the acquired position condition is violated. More specifically, the controller 120 obtains the position information of the terminal from the GPS receiver 110 and examines whether or not the terminal moves out of the designated radius or the designated position region for the appointed hour. When the position condition is violated according to the examination result, the controller 120 can control the display part 130 or the alarm part 150 to warn the user of the position condition violation, and can send a message informing of the violation to the other terminal. Herein, when the position condition is violated, the controller 120 can receive a message requesting to periodically report of the position from the terminal which sends the position condition via the transceiver 100. Thus, the controller 120 periodically acquires its position information through the GPS receiver 110 and transmits the position information to the terminal which requests the position report. In so doing, the controller 120 determines whether the position monitoring is allowed to the terminal requesting the position report, periodically transmits its position information only when the position monitoring is allowed, and sends a message informing of no position report to the corresponding terminal when the position monitoring is not allowed. Herein, whether to allow the position monitoring can be set and edited by the user.

When receiving the message informing of the violation from the other terminal, the controller 120 can check a user setting indicative of whether to track the position of the other terminal. Upon confirming the position tracking, the controller 120 can send a message requesting to periodically report of the position to the other terminal. When receiving the position information from the other terminal on the periodic basis, the controller 120 analyzes the position information and displays the analyzed position information through the display part 130. The controller 120 can calculate a distance and a direction between the two terminals using the position information of the terminal and the position information of the other terminal or calculate a distance and a direction between the other terminal and the designated radius or the designated position region of the position condition so that the user of the terminal can intuitively recognize the position of the other terminal, and then control to display the calculated information on the display part 130. Herein, the distance information between the two terminals or the distance information between the other terminal and the designated radius or the designated position region can be displayed at a terminal having no map function.

The display part 130 can display status information of the mobile communication terminal, numbers and characters, videos, and still images, can display a position condition input window under the control of the controller 120, and can display the analyzed position condition. The display part 130 can display the message warning of the position condition violation under the control of the controller 120, and can display the message informing that the target terminal violates the position condition. Under the control of the controller 120, the display part 130 can display the position information of the terminal, the position information of the target terminal monitored or warned, the distance and the direction information between the two terminals, and the distance and the direction information between the target terminal and the designated radius or the designated position region set as the position condition.

The input part 140 provides key input data corresponding to a key pressed by the user to the controller 120. In particular, the input part 140 can receive the position condition from the user and provides the position information to the controller 120.

The input part 140 including the touch manager 142 detects the user's touch and operates based on the user's touch input according to instructions of the controller 120. In an embodiment, when the user's touch is input, the touch manager 142 can provide the coordinates of the touch input to the controller 120, and confirm and output data corresponding to the location of the touch input to the display part 130. The user touch input information detected by the touch manager 142 is used to determine the region designated by the user.

The alarm part 150 can activate the alarm or the vibration preset to warn the position condition violation under the control of the controller 120.

In the above explanations, the target terminal monitored or warned may not include the GPS receiver.

While the controller 120 may function as the region information generator 160, the controller 120 and the region information generator 160 are described as separate elements to ease the understanding and not limit the scope of the invention. One skilled in the art would understand that various changes and modifications may be made without departing from the spirit and scope of the invention. For example, the controller 120 can process all of the functions of the region information generator 140.

Figure 2:
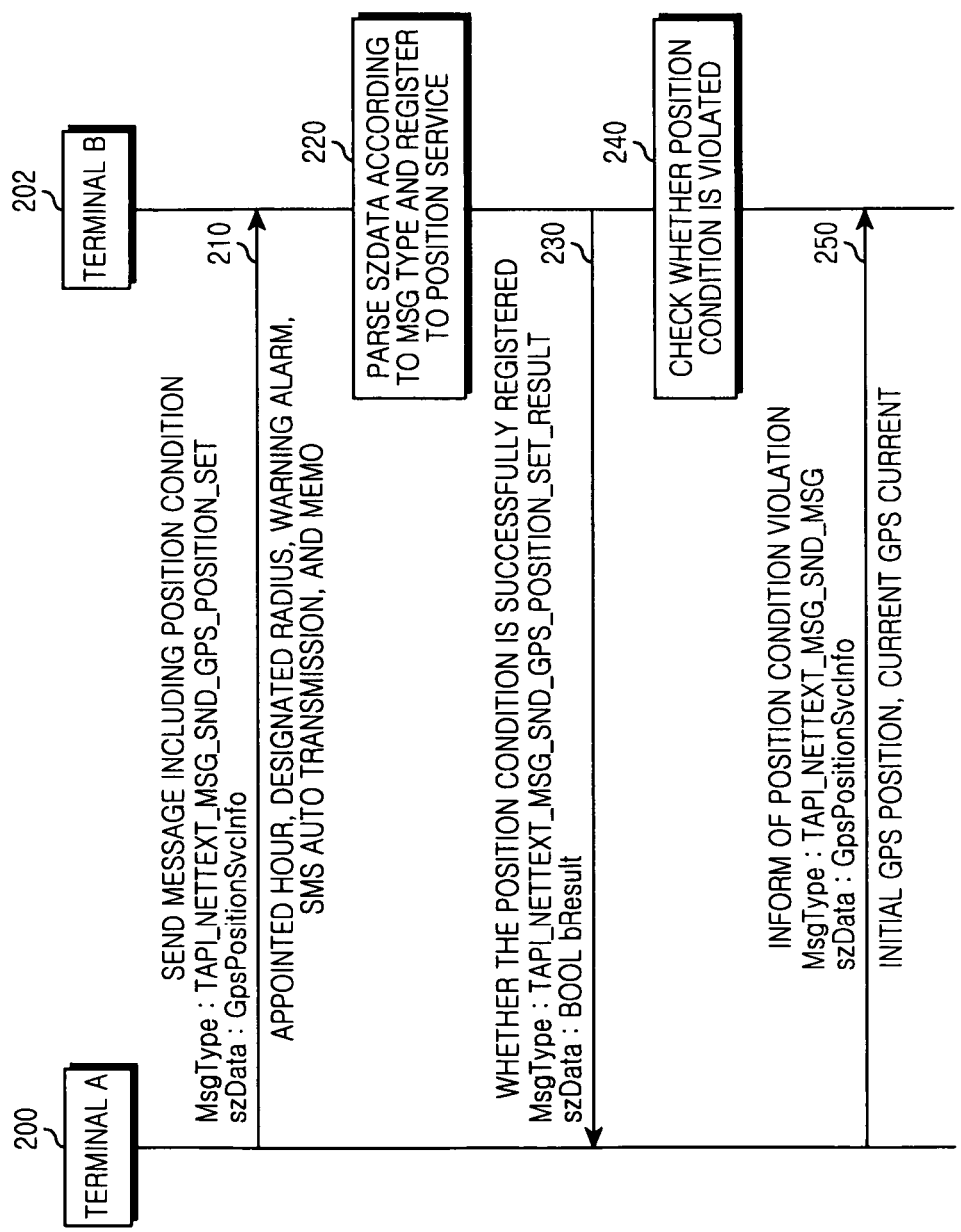
FIG. 2 illustrates signaling transmitted and received between mobile communication terminals to provide a position information service according to an embodiment of the present invention.

FIG. 2 illustrates signaling transmitted and received between the mobile communication terminals to provide the position information service according to an embodiment of the present invention.

To monitor or warn the position of the terminal B 202, the terminal A 200 generates the GPS SVC type message including the position condition of the terminal B 202 and sends the generated message to the terminal B 202 in step 210. Herein, the GPS SVC type message can include the information relating to the service type, the appointed hour, the designated radius, the designated position region, the SMS automatic transmission setting, and the memo as the position conditions as shown in FIG. 6.

Receiving the message from the terminal A 200, the terminal B 202 confirms that the received message type is the GPS SVC type, acquires the position condition by analyzing the message, and registers the position condition to provide the position service in step 220. In step 230, the terminal B 202 sends a signal indicating whether the position condition is successfully registered, to the terminal A 200.

Next, the terminal B 202 can examine whether the position condition is violated or not. More particularly, the terminal B 202 examines whether or not the terminal moves out of the designated radius or the designated position region for the appointed hour by periodically acquiring its position information through the GPS receiver. When the position condition is violated, the terminal B 202 sends the message regarding the position condition violation to the terminal A 200. The message regarding the position condition violation can be an SMS type message or a GPS SVC type message, and can include initial position information and current position information of the terminal B 202.

Figure 3:
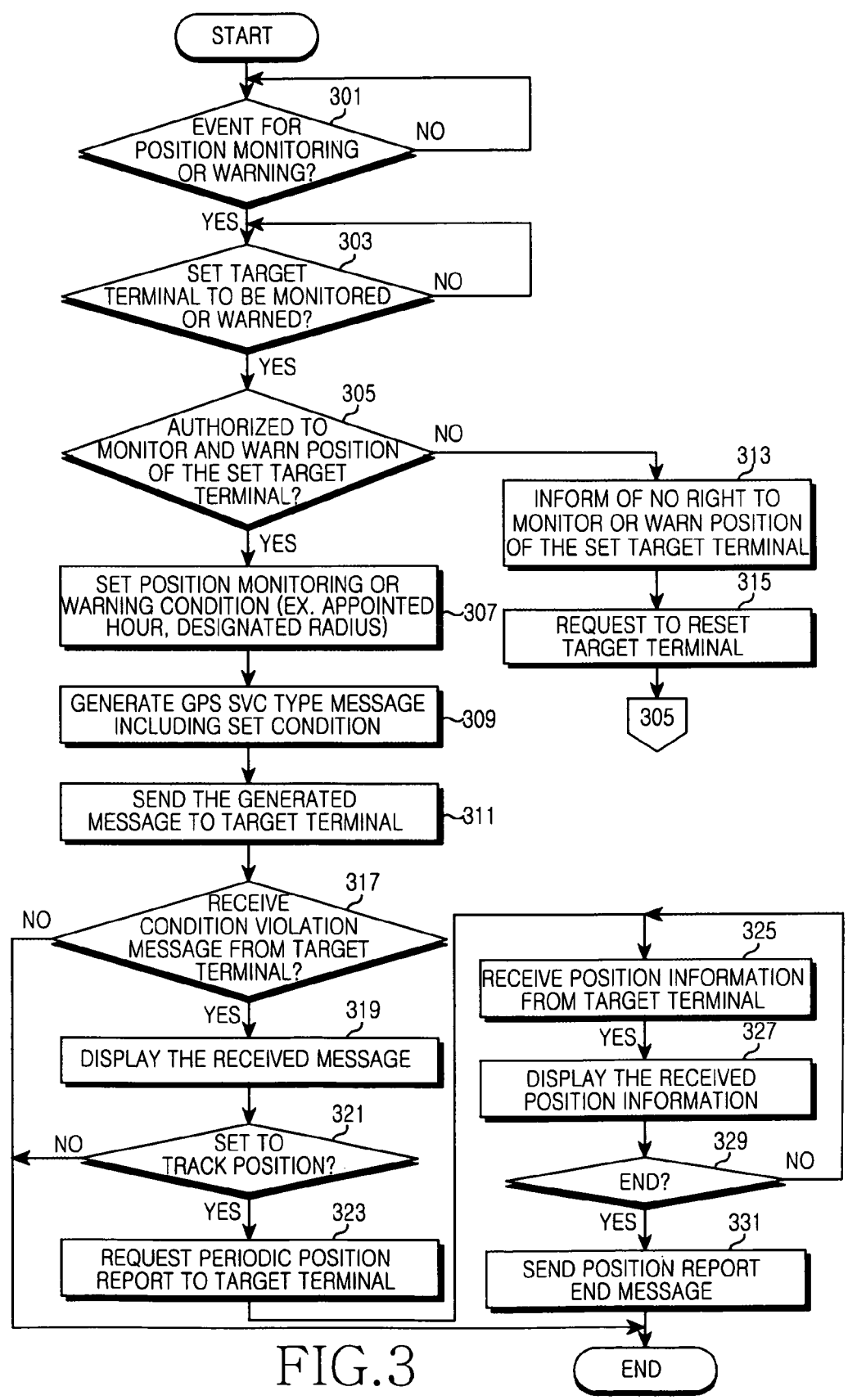
FIG. 3 illustrates operations of a tracer terminal which tracks the position according to an embodiment of the present invention.

FIG. 3 illustrates operations of the tracer terminal according to an embodiment of the present invention.

In step 301, the tracer terminal determines whether the event for monitoring or warning the position of the other terminal is generated or not. When the event is generated, the tracer terminal determines whether the target terminal to be monitored or warned is set in step 303. For example, the tracer terminal checks whether a phone number of the target terminal is directly input or the target terminal is selected in a phone book.

When the target terminal is set, the tracer terminal checks whether it has the right to monitor or warn the position of the set terminal in step 305. The right to monitor or warn the position can be acquired by transmitting and receiving separate messages for requesting the authority, and obtained typically in various methods used for the mutual authentication between the terminals.

When having no authority, the tracer terminal displays a message informing of no authority to monitor or warn the position of the set target terminal in step 313, displays a message requesting to reset the target terminal in step 315, and returns to step 305.

When having the authority, the tracer terminal sets the condition for monitoring or warning the position by displaying the position condition input window as shown in FIG. 6 in step 307. Herein, the condition for monitoring or warning the position should include at least one of the service type, the appointed hour, the designated radius, the designated position region, the SMS automatic transmission setting, and the memo information.

Figure 8A:
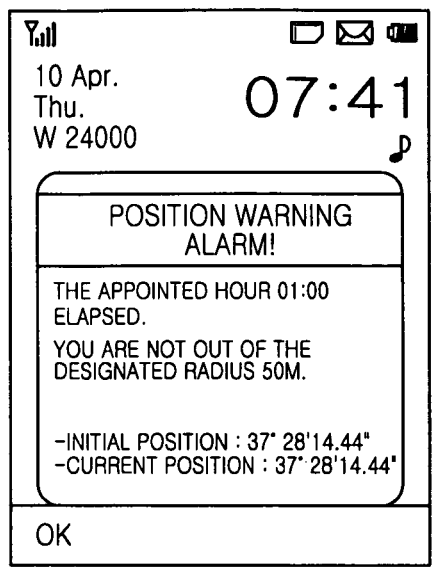
FIGS. 8A and 8B illustrate screen views informing of violation of the position condition at the target terminal according to an embodiment of the present invention.
Figure 8B:
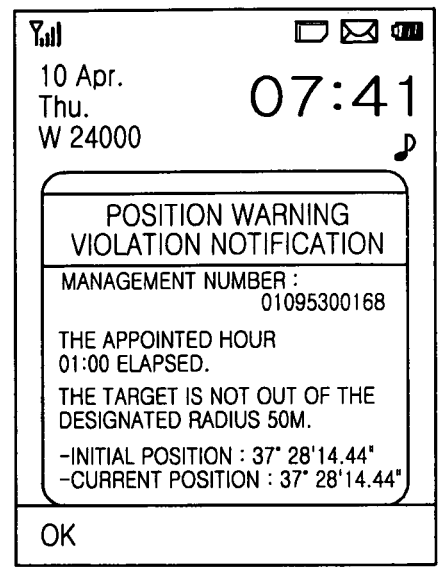
Figure 9A:
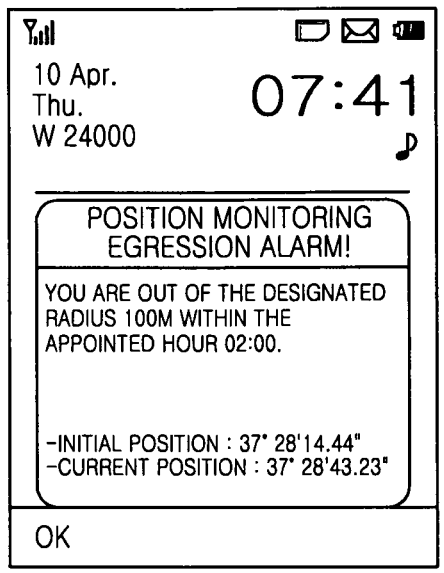
FIGS. 9A and 9B illustrate screen views informing of the position condition violation of the target terminal at the tracer terminal according to an embodiment of the present invention.
Figure 9B:
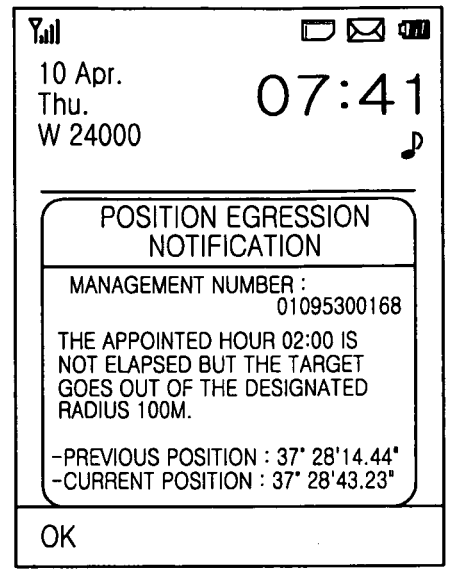

Next, the tracer terminal generates the GPS SVC type message including the set condition in step 309, sends the generated message to the set target terminal in step 311, and determines whether the condition violation message is received from the target terminal in step 317. For example, the tracer terminal checks whether the message indicative of the position condition violation of the set terminal of FIG. 8B or FIG. 9B is received or not.

When not receiving the condition violation message, the tracer terminal finishes this process. When receiving the condition violation message, the tracer terminal displays the received message in step 319.

Figure 10:
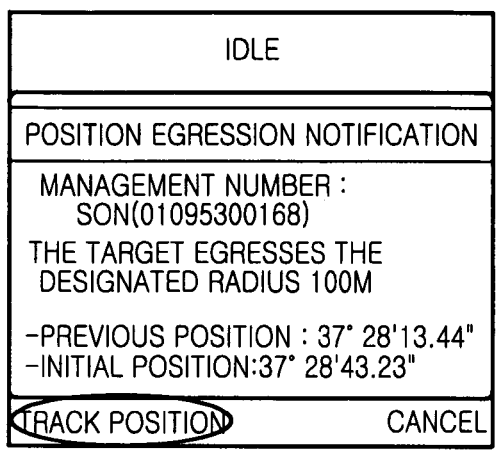
FIG. 10 illustrates a screen view for setting the position tracking function for the target terminal at the tracer terminal according to an embodiment of the present invention.

In step 321, the tracer terminal examines whether the user sets the position tracking function. For example, the terminal examines whether a menu for tracking the position of the target terminal is selected as shown in FIG. 10. Herein, the position tracking function, which is a function for tracking the position of the target terminal violating the condition in real time, can commence or end according to the user's setting.

When the position tracking function is not set, the tracer terminal finishes this process. When the position tracking function is set, the tracer terminal sends the message requesting to periodically report of the position to the target terminal in step 323.

Figure 11A:
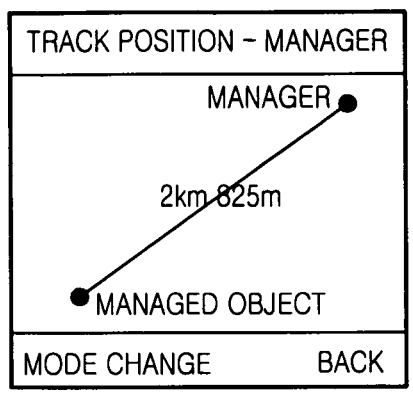
FIGS. 11A, 11B and 11C illustrate screen views of the position of the target terminal at the tracer terminal according to an embodiment of the present invention.
Figure 11B:
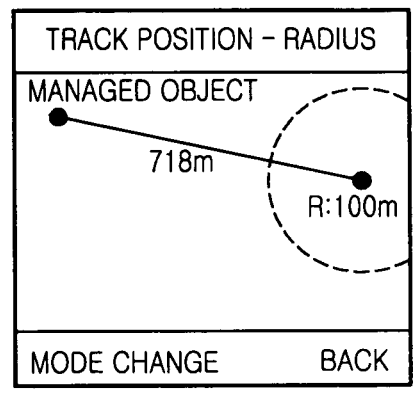
Figure 11C:
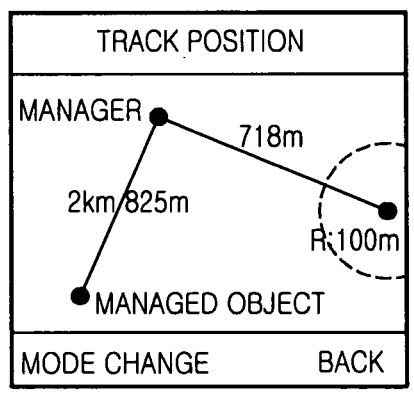

Next, the tracer terminal receives the position information from the target terminal in step 325 and displays the received position information on the screen in step 327. The tracer terminal can display merely coordinate information of the position of the target terminal on the screen, or the distance and the direction between the tracer terminal and the target terminal or the distance and the direction between the target terminal and the designated radius or the designated position region on the screen so that the user of the terminal can intuitively recognize the position of the target terminal. For example, the tracer terminal can display that the managed object, which is the target terminal, is away from the manager, which is the tracer terminal, to the northeast by 2 km 825 m as shown in FIG. 11A, or that the managed object, which is the target terminal, is away from the designated radius or the designated position region northwest by 718 m as shown in FIG. 11B. The tracer terminal may display which direction and how far the managed object is away from the manager and the designated radius or the designated position region as shown in FIG. 11C. Herein, the distance information and the direction can be obtained from the coordinates indicative of the position information. Such a function can be executed in a terminal that does not include a map function. The terminal with the map function is able to display the positions of the terminal, the target terminal, and the designated radius or the designated position region and their distance information on the map.

In step 329, the tracer terminal determines whether the position tracking function of the target terminal is ended. When the position tracking function does not end, the tracer terminal goes back to step 325. When the position tracking function ends, the tracer terminal sends a message indicative of the termination of the position report to the target terminal in step 331 and then finishes this process.

While the tracer terminal executes the position tracking function on the target terminal after receiving the message informing of the condition violation from the target terminal, the tracer terminal may perform the position tracking function on the target terminal without receiving the message informing of the condition violation.

Figure 4A:
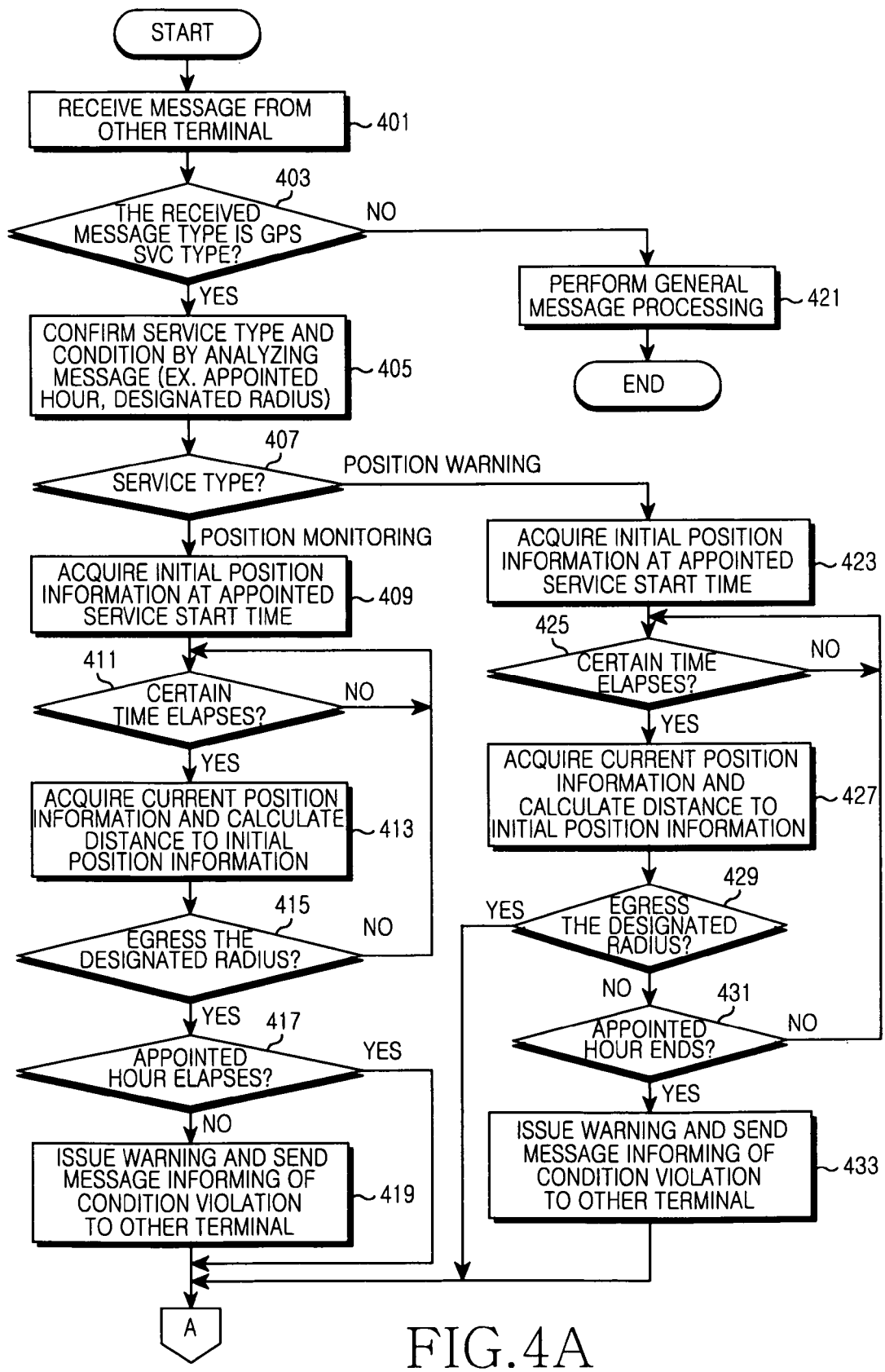
FIGS. 4A and 4B illustrate operations of a target terminal according to an embodiment of the present invention.
Figure 4B:
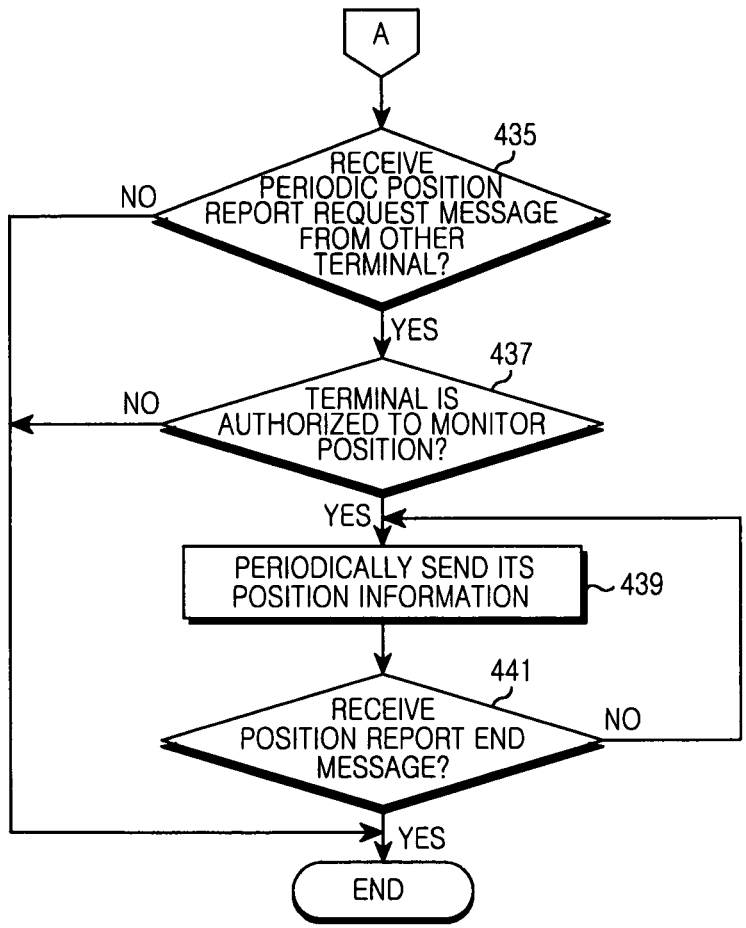

FIGS. 4A and 4B illustrate operations of the target terminal according to an embodiment of the present invention.

The target terminal receives the message from the other terminal in step 401 and determines whether the received message type is the GPS SVC type in step 403. When the received message type is not the GPS SVC type, the target terminal performs a general message processing on the received message in step 421 and then finishes this process.

When the received message type is the GPS SVC type, the target terminal confirms the service type and the other position conditions for the position monitoring or warning by analyzing the message in step 405. Herein, the condition for the position monitoring or warning should include at least one of the service type, the appointed hour, the designated radius, the designated position region, the SMS automatic transmission setting, and the memo information. When the received message type is the GPS SVC type, the target terminal can confirm the service type and the position conditions by analyzing the message and display the confirmed information as shown in FIG. 7 to notify that the other terminal; that is, the tracer terminal requests the position monitoring or warning service.

In step 407, the target terminal determines whether the service type is the position monitoring or the position warning. Herein, the position monitoring service blocks the target terminal from leaving out of the designated radius or the designated position region for the appointed hour, and the position warning service makes the target terminal to move out of the designated radius or the designated position region within the appointed hour.

When the service type is the position warning service, the target terminal acquires the initial position information at the appointed service start time in step 423. That is, the target terminal acquires its position information through the GPS receiver at the start time by checking the service start time in the position condition. Next, the target terminal determines whether a certain time elapses in step 425. When the certain time passes by, the target terminal acquires its current position information and calculates the distance to the initial position information in step 427.

In step 429, the target terminal determines whether the calculated distance exceeds the designated radius or the designated position region of the position condition. When the calculated distance exceeds the designated radius or the designated position region, the target terminal proceeds to step 435. By contrast, when the calculated distance does not exceed the designated radius or the designated position region, the target terminal determines whether the appointed hour of the position condition ends; that is, whether the end time of the position condition elapses in step 431. When the appointed hour does not end, the target terminal returns to step 425. When the appointed hour ends, the target terminal issues the warning message or the warning alarm and sends a message informing of the position condition violation to the tracer terminal in step 433. More specifically, when the target terminal does not egress the designated radius or the designated position region within the appointed hour, the target terminal displays the warning message to its user as shown in FIG. 8A and sends a message of FIG. 8B to the other user who requests the position warning service. The warning message and the message informing of the position condition violation can include the initial position information and the current position information as shown in FIGS. 8A and 8B.

Next, the target terminal goes to step 435.

When the service type is the position monitoring service, the target terminal obtains the initial position information at the appointed service start time in step 409. That is, the target terminal acquires its position information through the GPS receiver at the start time by checking the service start time in the position condition. Next, the target terminal checks whether a certain time passes by in step 411. When the certain time elapses, the target terminal acquires its current position information and calculates the distance to the initial position information in step 413.

In step 415, the target terminal determines whether the calculated distance exceeds the designated radius or the designated position region of the position condition. When the calculated distance does not exceed the designated radius or the designated position region, the target terminal goes back to step 411. When the calculated distance exceeds the designated radius or the designated position region, the target terminal determines whether the appointed hour of the position condition ends or not; that is, whether the end time of the position condition elapses or not in step 417. When the appointed hour ends, the target terminal proceeds to step 435. When the appointed hour does not end, the target terminal issues the warning message or the warning alarm and sends a message informing of the position condition violation to the tracer terminal in step 419. More specifically, when the target terminal moves out of the designated radius or the designated position region within the appointed hour, it displays the warning message of FIG. 9A to its user and sends the message of FIG. 9B to the other user who requests the position warning message. The warning message and the message informing of the position condition violation can include the initial position information and the current position information as shown in FIGS. 9A and 9B.

In step 435, the target terminal determines whether the message requesting the periodic report of the position is received from the tracer terminal. When receiving no message requesting the periodic position report from the tracer terminal, the target terminal finishes this process.

Upon receiving the message requesting the periodic position report from the tracer terminal, the target terminal examines whether the tracer terminal requesting the periodic position report is authorized to monitor its position in step 437. Herein, whether to authorize the terminal to monitor the position can be set and edited by the user. When the tracer terminal is not authorized to monitor the position of the target terminal, the target terminal finishes this process.

Alternatively, when the tracer terminal is authorized to monitor the position of the target terminal, the target terminal periodically transmits its position information to the tracer terminal in step 439. In step 441, the target terminal determines whether a position report end message is received. When not receiving the position report end message, the target terminal goes back to step 439. When receiving the position report end message, the target terminal finishes this process.

Figure 12:
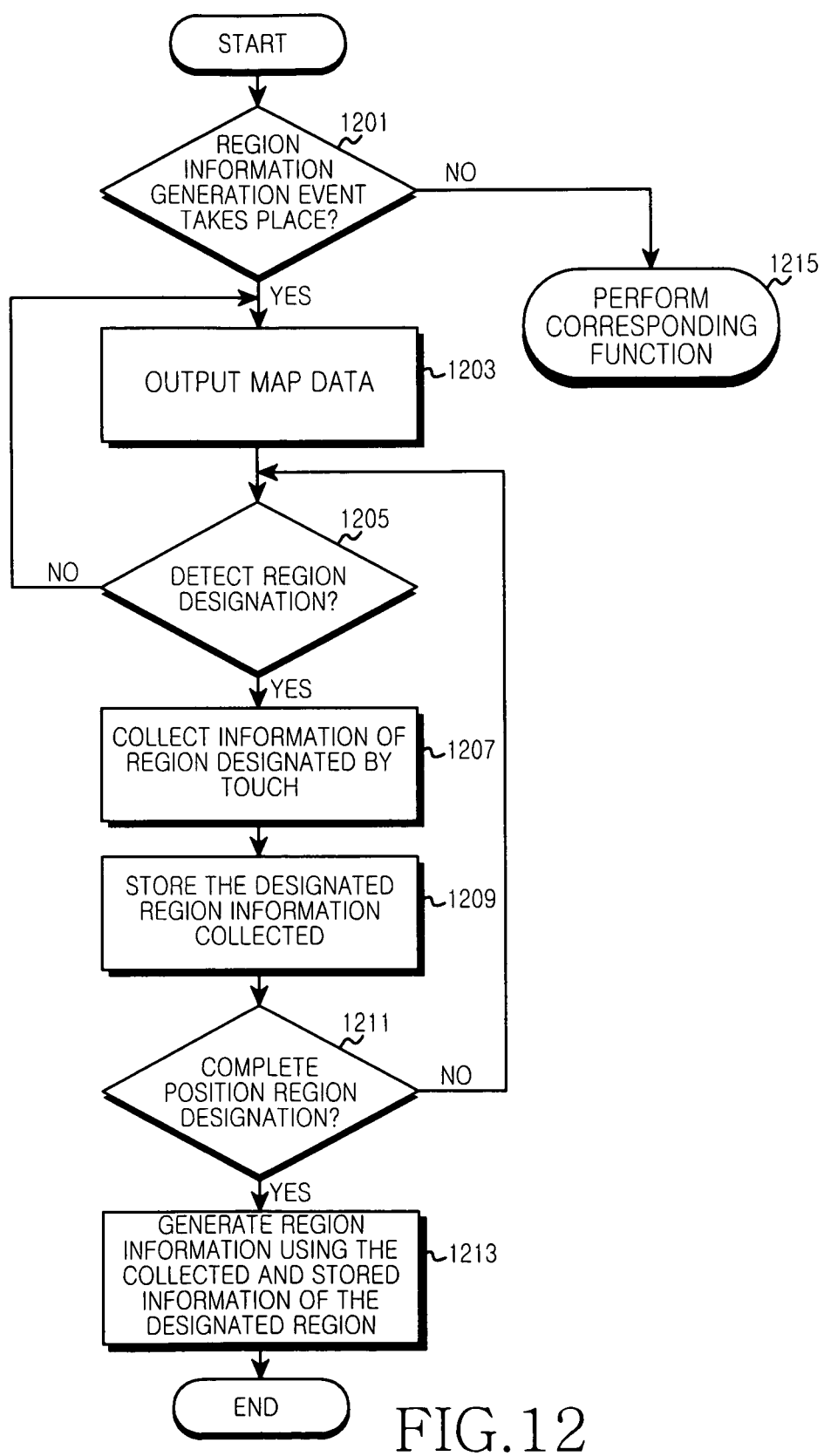
FIG. 12 illustrates operations of the tracer terminal for generating region information according to an embodiment of the present invention.

FIG. 12 illustrates operations of the tracer terminal for generating the region information according to an embodiment of the present invention.

In step 1201, the tracer terminal determines whether a region information generation event takes place. The region information generation event, which is an event for designating the user's desired position region in the map data, may occur when the position condition is set. In addition, the region information generation event can take place when another position information service is used.

When the region information generation event does not occur, the tracer terminal performs the corresponding function (e.g., standby mode) in step 1215. In contrast, when the region information generation event takes place, the tracer terminal outputs the map data to the display part 130 in step 1203.

In step 1205, the tracer terminal examines whether the position region is set by the user. That is, the tracer terminal detects whether the user touches the screen to designate his/her wanted region in the map data output in the screen.

When the user does not designate the position region, the tracer terminal goes back to step 1203 to output the map data and to determine whether or not the user designates the position region.

When the user designates the position region, the tracer terminal collects information of the region designated by the user's touch in step 1207. The designated region information indicates information of the map data and information according to the detected user's touch, and includes the user's touch point; that is, the touch start point, the actual latitude and longitude corresponding to the touch start point, the scale of the map, and the coordinates of user's touch points.

Next, the tracer terminal stores the designated region information in step 1209, and determines whether the position region designation according to the user touch is completed in step 1211. By examining whether the user touches the same point repeatedly, the tracer terminal can determine whether the position region designation is completed.

When the position region designation is not completed, the tracer terminal returns to step 1205.

In contrast, when the position region designation is completed, the tracer terminal generates the position region information using the designated region information collected and stored in step 1213. Herein, the position region information is the map information for the region designated by the user of the tracer terminal. The user of the terminal can set the position region designated by touching the screen as stated above as the position condition of the target terminal and can use the position region information in other position information services.

Figure 5A:
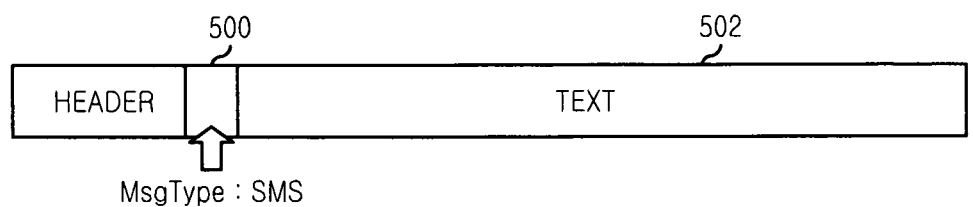
FIGS. 5A and 5B illustrate messages for providing the position information service according to an embodiment of the present invention.
Figure 5B:
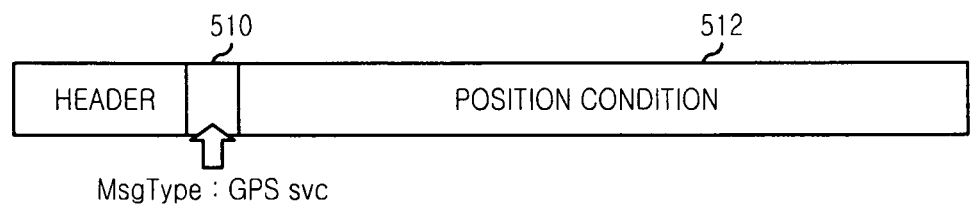

The position region information, which may be transmitted to other terminals, may be carried by the position condition field 512 of FIG. 5B or as a separate message of FIG. 13. Namely, the position region information may include the header 1301, the message content field 1303, and the designated region information field 1305 as shown in FIG. 13.

The header field 1301 includes message type information indicating that the corresponding message carries the position region information, and the message content field 1303 includes contents to be added by the terminal user. The designated region information field 1305 includes the coordinates of the user touch start point in the map data, the actual latitude and longitude corresponding to the touch start point, the scale of the map, and the coordinates of user's touch points so that even the terminal receiving the message can acquire the region designated by the user's touch. That is, the terminal receiving the position region information may acquire the corresponding region by comparing the information of the designated region with the actual map data.

FIG. 13 illustrates the position region information according to an embodiment of the present invention.

The position region information of FIG. 13, which is the message for sending the region designated by the user to other user, may include the header 1301, the message content field 1303, and the designated region information field 1305.

The header field 1301 includes the message type information 1307 informing that the corresponding message carries the position region information, and the message content field 103 includes the contents to be added by the terminal user. The designated region information field 1305 includes start coordinates 1309 of the region designated by the user in the map data, latitude and longitude information 1311 of the actual map, an aspect ratio 1313, and coordinates 1315 of the regions touched by the user.

FIGS. 14A through 14D illustrate the generation of the position region information by setting the position region according to the user touch in the tracer terminal according to an embodiment of the present invention.

FIGS. 14A and 14B depict the screen of the tracer terminal in which the region is set by the user touch according to an embodiment of the present invention.

When the terminal outputs the map data 1401 for a particular region, the user can designate the position region 1405 by touching his/her intended region of the map data output in the screen. When the touched region overlaps and the closed-curve or closed-polygon touch is detected based on an initial point 1403 of the user's touch, the position region can be set to the region 1405 within the closed curve or the closed polygon.

FIG. 14C depicts coordinates of the region designated by the user touch in the tracer terminal according to an embodiment of the present invention.

The terminal may collect coordinates around the user's touch, connect the coordinates of the touch in the counter-clockwise direction based on the start coordinates (5, 10) of the region, and thus generate information including the coordinates of the region designated by the user's touch. As such, the information indicating the coordinates of the region designated by the user's touch is used to generate the position region information.

FIG. 14D depicts the region information indicative of the information of the region designated by the user touch in the tracer terminal according to an embodiment of the present invention.

The designated region information used to generate the position region information can include ① the actual GPS coordinates corresponding to the start coordinates of the region, ② and ③ the actual GPS latitude and longitude information, ④ the ratio of the screen to the real distance (i.e. scale), and ⑤, ⑥ and ⑦ the coordinates of the region boundary, which can be assumed as below:

the actual GPS coordinates corresponding to the start coordinates of the region; the start coordinates (5, 10), the latitude; 0.00319308 and the longitude; 0.00103326 of the actual GPS coordinates, the ratio of the screen to the real distance; 1:10000 (1 cm in the screen is 100 m on the ground), the (counterclockwise) coordinates of the region boundary.

As described above, the position region information, which includes the start coordinates, the actual latitude and longitude of the start coordinates, the aspect ratio, and the x and y coordinates of the region boundary, can be simplified by means of special characters.

The special characters in the position region information can be defined as below:

(a) &: a large discriminator for large data (b) %: a medium discriminator for similar data (c) ,: a discriminator for the y coordinate when a plurality of y coordinates is spaced apart from the corresponding the x coordinate. For example, mark 10, 14 to distinguish the y coordinates 10 and 14 corresponding to the x coordinate 6 as in (6, 10), and (6, 14).

(d) –: a discriminator for the ranging of the y coordinate when a plurality of y coordinates is consecutive for the corresponding x coordinate. For example, mark 11-13 when the y coordinates corresponding to the x coordinate 4 are 11, 12, and 13 in succession as in (4, 11), (4, 12), (4, 13).

(e) +: distinguishes the x coordinate. When + follows the x coordinate of the line start, the x coordinate increases by one and the y coordinate corresponding to the x coordinate is expressed. For example, when 4%11-13+10-11,13-14 . . . is given, (5, 10), (5, 11), (5, 13), (5, 14) are expressed by increasing the x coordinate of (4, 11), (4, 12), (4, 13) by one.

As such, the particular mobile communication terminal sends the message including the position condition to the target mobile communication terminal. When the target mobile communication terminal violates its position condition, it informs the particular mobile communication terminal of the violation. Thus, the position information service independent of the mobile communication provider network can be provided. Since the target mobile communication terminal informs the particular mobile communication terminal of its violation when it violates the position condition, there is no need to periodically check the position of the target mobile communication terminal. By predicting the movement of the target mobile communication terminal, accidents or troubles can be prevented in advance. When the target mobile communication terminal violates the position condition, the position of the target mobile communication terminal is traced and displayed in real time so that how far the target mobile communication terminal goes out of the designated range can be determined with ease.

Furthermore, as the user designates the position region by touching the map data output on the screen of the mobile communication terminal, it is possible to set only the position region including the wanted region as the position condition.

While the invention has been shown and described with reference to certain embodiments thereof, it will be understood by those skilled in the art that various changes in form and details may be made therein without departing from the spirit and scope of the invention as defined by the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a mobile communication terminal requesting to provide position information, the method comprising:
    displaying a map for a user of the terminal;
    detecting a plurality of touches of the user;
    identifying a plurality of coordinates of the map corresponding to the touches;
    generating a designated position region based on the identified coordinates;
    generating a message comprising a position condition for a correspondent terminal, wherein the position condition comprises information identifying the designated position region, and wherein the information identifying the designated position region comprises start coordinates corresponding to a first touch of the user, a latitude and a longitude corresponding to the start coordinates, an aspect ratio of the map, and a plurality of region coordinates corresponding to touches of the user other than the first touch;
    sending the generated message to the correspondent terminal; and
    receiving a message indicating whether the position condition is violated from the correspondent terminal.

2. The method of claim 1, wherein the position condition further comprises at least one of a service type, an appointed time, a designated radius, a Short Message Service automatic transmission setting, and memo information.

3. The method of claim 1, wherein the message comprising the position condition is a message requesting to provide the position information using a message type.

4. The method of claim 1, further comprising:
requesting the correspondent terminal to periodically provide the position information;
periodically receiving the position information of the correspondent terminal; and
calculating and displaying a distance and a direction of the correspondent terminal with respect to the terminal using the position information of the correspondent terminal and the position information of the terminal.

5. The method of claim 4, further comprising:
calculating and displaying a distance and a direction of the correspondent terminal with respect to the designated position region of the position condition.

6. A method of a mobile communication terminal requested to provide position information, the method comprising:
receiving a message comprising a position condition from a correspondent terminal, wherein the position condition comprises information identifying a designated position region, wherein the designated position region comprises a plurality of coordinates of a map corresponding to a plurality of touches of a user, and wherein the information identifying the designated position region comprises start coordinates corresponding to a first touch of the user, a latitude and a longitude corresponding to the start coordinates, an aspect ratio of the map, and a plurality of region coordinates corresponding to touches of the user other than the first touch;
determining whether the position condition is violated by periodically acquiring position information of the terminal; and
sending a message indicating whether the position condition is violated to the correspondent terminal.

7. The method of claim 6, wherein the position condition further comprises at least one of a service type, an appointed time, a designated radius, a Short Message Service automatic transmission setting, and memo information.

8. The method of claim 6, further comprising:
when the position condition is violated, displaying a message informing of the position condition violation or producing a warning sound.

9. The method of claim 6, wherein determining whether the position condition is violated by periodically acquiring the position information of the terminal comprises:
when the service type is a position warning service and the terminal does not move out of the designated position region within the appointed hour, determining that the position condition is violated; and
when the service type is a position monitoring service and the terminal moves out of the designated position region within the appointed hour, determining that the position condition is violated.

10. The method of claim 6, further comprising:
receiving a message requesting a periodic position report from the correspondent terminal;
determining whether the correspondent terminal is authorized to monitor the position of the terminal; and
periodically transmitting position information of the terminal to the correspondent terminal.

11. An apparatus for use in a mobile communication terminal configured for requesting to provide position information, the apparatus comprising:
a display unit configured to display a map for a user of the terminal;
a controller configured to detect a plurality of touches of the user, identify a plurality of coordinates of the map corresponding to the touches, generate a designated position region based on the identified coordinates, and generate a message comprising a position condition for a correspondent terminal, wherein the position condition comprises information identifying the designated position region, and wherein the information identifying the designated position region comprises start coordinates corresponding to a first touch of the user, a latitude and a longitude corresponding to the start coordinates, an aspect ratio of the map, and a plurality of region coordinates corresponding to touches of the user other than the first touch; and
a transceiver configured to send the generated message to the correspondent terminal under the control of the controller and further configured to receive a message from the correspondent terminal, the message indicating whether the position condition is violated.

12. The apparatus of claim 11, wherein the position condition further comprises at least one of a service type, an appointed time, a designated radius, a Short Message Service automatic transmission setting, and memo information.

13. The apparatus of claim 11, wherein the message comprising the position condition is a message requesting to provide the position information using a message type.

14. The apparatus of claim 11, wherein the controller is further configured to request the correspondent terminal to periodically provide the position information, to receive periodically the position information of the correspondent terminal through the transceiver, and to calculate a distance and a direction of the correspondent terminal with respect to the terminal using the position information of the correspondent terminal and position information of the terminal, and wherein the display unit is further configured to display the distance and the direction calculated at the controller.

15. The apparatus of claim 14, wherein the controller is further configured to calculate a distance and a direction of the correspondent terminal with respect to the designated position region of the position condition.

16. An apparatus of a mobile communication terminal requested to provide position information, the apparatus comprising:
a transceiver configured to receive a message comprising a position condition from a correspondent terminal, wherein the position condition comprises information identifying a designated position region, wherein the designated position region comprises a plurality of coordinates of a map corresponding to a plurality of touches of a user, and wherein the information identifying the designated position region comprises start coordinates corresponding to a first touch of the user, a latitude and a longitude corresponding to the start coordinates, an aspect ratio of the map, and a plurality of region coordinates corresponding to touches of the user other than the first touch;
a Global Positioning System (GPS) receiver configured to acquire position information of the terminal; and
a controller configured to determine whether the position condition is violated by periodically acquiring the position information of the terminal through the GPS receiver and configured to control the transceiver to send a message indicating whether the position condition is violated to the correspondent terminal.

17. The apparatus of claim 16, wherein the position condition further comprises at least one of a service type, an appointed time, a designated radius, a Short Message Service automatic transmission setting, and memo information.

18. The apparatus of claim 16, further comprising:
a display part configured to, when the position condition is violated, display a message informing of the position condition violation under control of the controller; and
an alarm part configured to produce a warning sound notifying the position condition violation under the control of the controller.

19. The apparatus of claim 16, wherein, when the service type is a position warning service and the terminal does not move out of the designated position region within the appointed hour, the controller is further configured to determine that the position condition is violated, and
when the service type is a position monitoring service and the terminal moves out of the designated position region within the appointed hour, the controller is further configured to determine that the position condition is violated.

20. The apparatus of claim 16, wherein the controller is further configured to determine whether the correspondent terminal is authorized to monitor the position of the terminal when receiving a message requesting a periodic position report from the correspondent terminal and to control a function to periodically transmit the position information of the terminal to the correspondent terminal.

* * * * *